(12) United States Patent
Douglas

(10) Patent No.: X9807
(45) Date of Patent: Jun. 30, 1836

(54) STOVES, PARLOR, & FIREPLACE

(76) Inventor: Beriah Douglas

Beriah Douglass of Albany New York.

Letters Patent.

The Schedule referred to in these Letters Patent and making part of the same, containing a description in the words of the said Beriah Douglass himself, of his improvement in the Cooking Stove.

Be it known that I Beriah Douglass of the City and County of Albany and State of New York, have invented a new and useful Cooking Stove, which is described as follows, reference being had to the annexed drawings of the same, making part of this Specification A circular Cast Iron plate A, of about 30 or 32 inches in diameter or of any convenient dimensions, is placed horizontally on legs 8 or 9 inches high, near the front this plate is cut out in a circle eight inches in diameter to admit a grate B, over which is set an upright cast iron cylinder or fire box C, about 11 inches in height. on the top of this box is placed another circular plate D, of the same dimensions as the one just described, in which a circular aperture is left to admit the upper end of the fire box left open for the fire and smoke to pass. The under edge of the upper plate, and the upper edge of the under plate, are grooved to admit a piece of sheet Iron E of the same width of the height of the Cylinder or fire box, and which is bent or shaped into a circular form to fit into the grooves in the plates, which, with the doors, encircles the fire box, and forms a large heat retainer, or oven. Rods are screwed into the upper plate — pass through the lower plate, and are secured with nuts, binding the whole together. above the upper plate are two connected collars F, for the passage of the fire and smoke and for boilers, under which the fire passes across the centre of the stove, from front to rear, where it enters the pipe. These collars are formed by a horizontal cast rim G, grooved in the under side, to which corresponds a groove made in the plate. into these grooves side pieces

H

H. are placed, of sufficient height for the boilers which are secured
by screwing down the horizontal rim to the plate, thus embracing
and holding fast the sides. On each side of these collars are
openings I, for boilers which are heated from the hot air in the
oven. The receiver K. for the ashes is placed under the cylinder
or fire box and is formed by a circular plate L. of about sixteen
inches in diameter, grooved near the upper edge, to corres=
pond with which there is made a groove in the under side of the
lower large plate, a strip of sheet iron M. is bent into these grooves,
of six inches in width, ~~and is~~ and is confined by screwing together
the two plates. Within this receiver or ash box, is an instrument
for cleaning the grate from ashes which may be called a shaker.
It is formed by a shaft N. distant two or three inches from the
grate and confined in boxes, to the plate above. The front end
projects through the side of the box, sufficiently ~~far~~ to receive
a moveable crank or straight handle O, of about one foot in
length for operating it. At right angles with this shaft teeth or
bars P, project from it to the centre of the grate, to which are attach
=ed perpendicular flat prongs Q, or pokers, which are forced up
and down through the grate by vibrating the shaft to the right & left
by the hand. Rotary stands similar to the one represented at
R, are placed in the oven for the convenience of supporting and
turning articles of cooking towards the fire box, or in any other
position required. They are formed by a bottom rim S, eight or
nine inches in diameter from which brace pieces T, reach obliqu
=ly upward to a circular centre piece U, on which is placed a con
=ical stem V, which has a pivot on the top that enters the centre of
a plate W. pierced with a number of holes having the same diameter
as the bottom rim — and is supported by braces against the stem
on the under side and can be easily turned round on the pivot hori
=zontally. — The fuel designed to be used principally in this stove
is the Anthracite coal; but wood may also be used by altering
the shape of the fire box from a circular to that of a rectangular
figure figure for the more convenient introduction of the sticks of wood; there being made a door in front for that purpose.

What I claim as my invention and which I desire to secure by Letters Patent, consist in the combination and arrangement of the several parts of the stove in the manner before described. But I particularly claim the peculiar arrangement of the oven by which boilers are set in or through the top plate by which they are thus heated from the hot air therein; the mode of constructing the collars and the manner of conducting the fire and smoke from the front to the rear over the centre; the manner of constructing the body of the stove and the ash box; the method of constructing the shaker or vibrating poker for cleaning the grate; and the rotary or moveable stand for the convenience of the oven.

In testimony whereof I have hereunto set my hand on this twenty third day of May, A.D. one thousand & eight hundred and thirty six.

Witnesses
Wm P. Elliot
J. C. F. Salomon

Seriah Douglas.

Exd [illegible]

924 words]

Date of Patent, June 30th 1836.

United States Patent
Patent No.: X9807
B. DOUGLAS.
COOK STOVE.
Patented June 30, 1836.
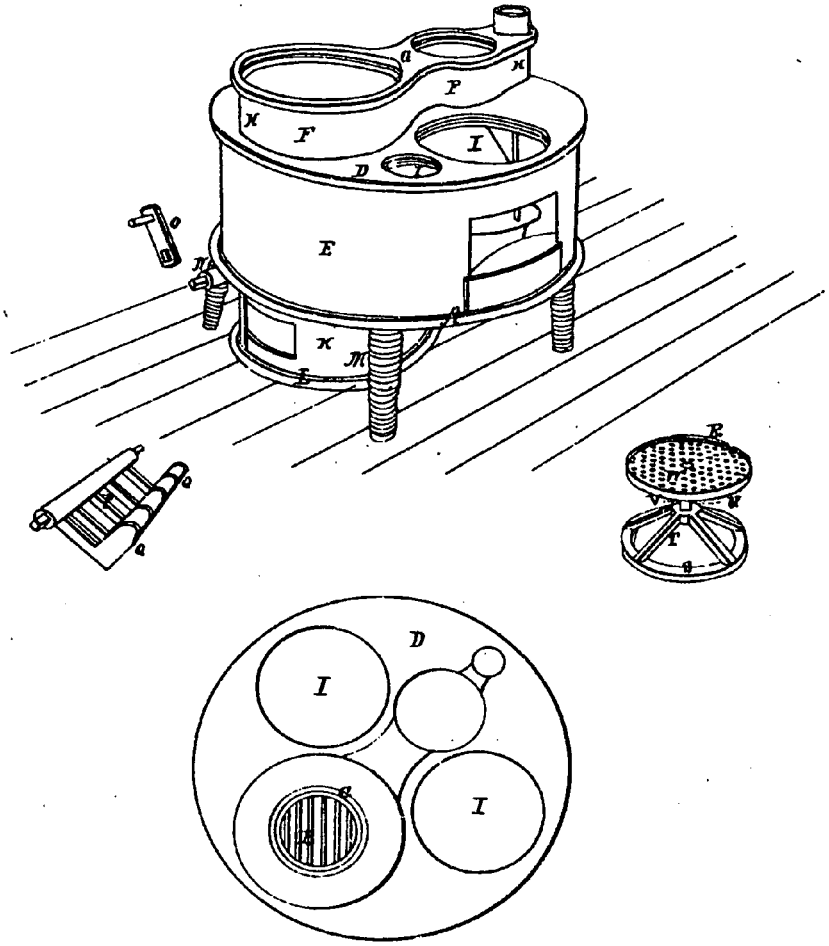
NO PRINTED SPECIFICATIONS AVAILABLE

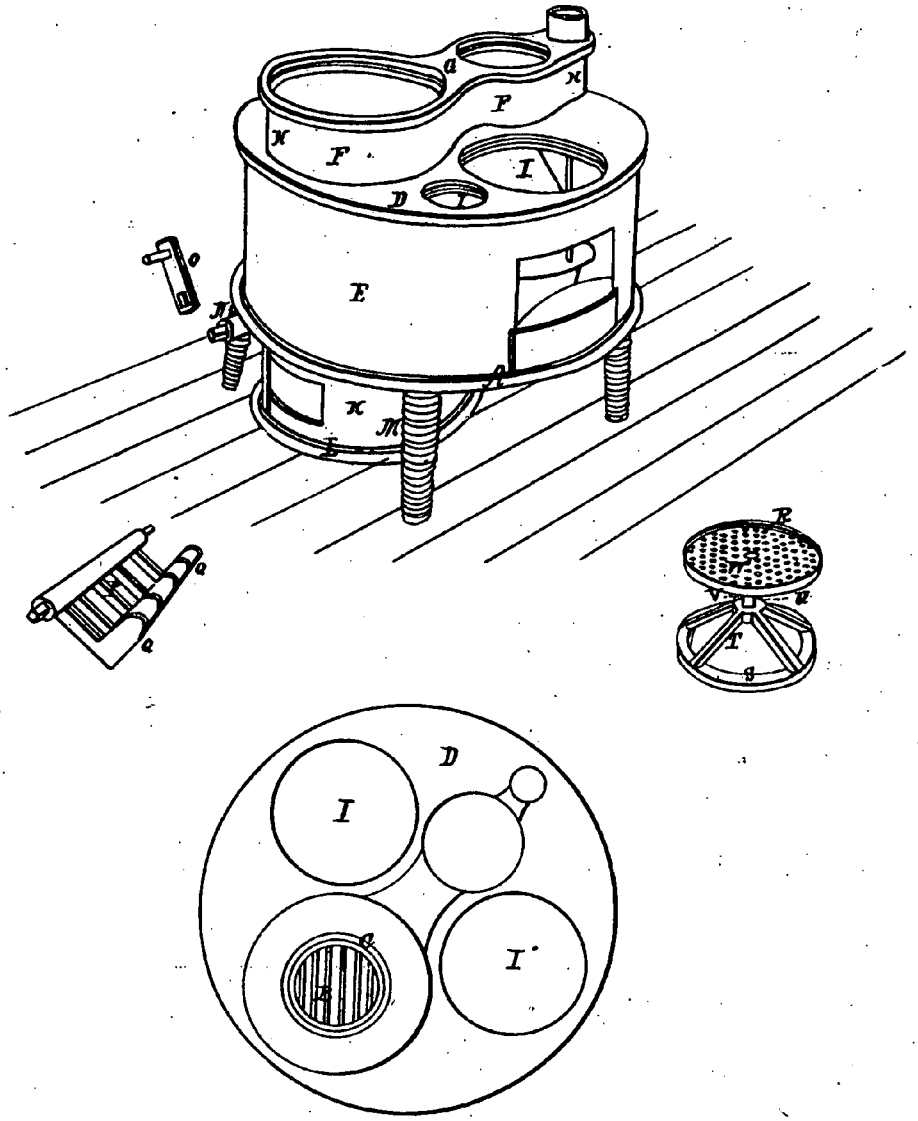

United States Patent
Patent No.: X9807
X9807
B. DOUGLAS.
COOK STOVE.
Patented June 30, 1836.